UNITED STATES PATENT OFFICE.

HENRY M. SCOTT AND HAKON ANDERSON, OF SHEBOYGAN FALLS, WISCONSIN.

COMPOSITION OF MATTER FOR USE WITH RENNET.

SPECIFICATION forming part of Letters Patent No. 714,748, dated December 2, 1902.

Application filed March 6, 1902. Serial No. 96,934. (No specimens.)

*To all whom it may concern:*

Be it known that we, HENRY M. SCOTT and HAKON ANDERSON, citizens of the United States, residing at Sheboygan Falls, in the county of Sheboygan and State of Wisconsin, have invented a new and useful Composition of Matter to be Used in Connection with Rennet in Coagulating Milk in the Manufacture and Production of Cheese, of which the following is a specification.

Our composition consists of the following ingredients combined in the proportions stated—to wit, calcium sulfite, seventy-five (75) parts; nitrate of potash, (saltpeter,) ten (10) parts; phosphate of soda, ten (10) parts; phosphate of magnesia, five (5) parts, these ingredients to be thoroughly mingled by agitation.

In using the above-named composition the milk should first be heated to a temperature of eighty-six (86°) degrees to ninety (90°) degrees Fahrenheit and be in proper condition for setting. The compound is first mixed one ounce to three quarts of cold water in the proportion of one ounce of the compound to one thousand (1,000) pounds of milk and added to the milk immediately before the rennet is added for setting. The Cheddar - process cheese is made from ripened milk—that is, milk with a high development of acid. The higher the development of acid the quicker, but less complete, the action of the rennet.

By using this compound the action of the rennet is intensified, causing a complete separation and collectiveness of casein. It obviates the white whey, which is prevalent from highly-ripened milk, leaving the whey clear and green. It also firms up the curd with less agitation and promotes the development of the desired lactic acid, leaving the curd in the proper velvety condition for salting.

What we claim, and desire to secure by Letters Patent of the United States, is—

1. The herein - described composition of matter for treating milk in cheese-making for an aid in coagulating milk, consisting of calcium sulfite, nitrate of potash, phosphate of soda and phosphate of magnesia, substantially as described and for the purpose specified.

2. The herein - described composition of matter for treating milk in cheese-making for the increase of yield and to improve the quality of cheese in its manufacture, consisting of pure calcium sulfite, seventy - five (75) parts; saltpeter, ten (10) parts; phosphate of soda, ten (10) parts; and phosphate of magnesia, five (5) parts, substantially as described.

In testimony whereof we have signed our names to this specification in the presence of two subscribing witnesses.

HENRY M. SCOTT.
HAKON ANDERSON.

In presence of—
J. P. OSTHELDER,
J. H. JAMES.